United States Patent [19]

Baran

[11] Patent Number: 5,094,792
[45] Date of Patent: Mar. 10, 1992

[54] ADJUSTABLE EXTRUSION COATING DIE

[75] Inventor: Glenn F. Baran, Trenton, N.J.

[73] Assignee: General Motors Corporation, Detroit, Mich.

[21] Appl. No.: 661,713

[22] Filed: Feb. 27, 1991

[51] Int. Cl.$^5$ .............................................. B29C 47/02
[52] U.S. Cl. .................................... 264/171; 118/411; 264/177.1; 264/177.16; 264/177.2; 425/113; 425/168; 425/466
[58] Field of Search ............... 264/177.1, 177.2, 174, 264/171, 40.5, 177.16; 425/113, 168, 114, 465, 466; 118/411, 410

[56] References Cited

U.S. PATENT DOCUMENTS

| | | | |
|---|---|---|---|
| 3,081,213 | 3/1963 | Chinn | 425/113 |
| 3,813,199 | 5/1974 | Friesner | 425/462 |
| 3,886,898 | 6/1975 | Colegrove et al. | 118/411 |
| 4,187,068 | 2/1980 | Vassar | 425/465 |
| 4,204,496 | 5/1980 | Ikegami et al. | 425/465 |
| 4,387,123 | 6/1983 | Wollam et al. | 118/411 |
| 4,722,818 | 2/1988 | Zoller | 264/177.1 |
| 4,756,271 | 7/1988 | Maier | 118/411 |
| 4,778,367 | 10/1988 | Hilakos | 425/466 |
| 4,984,533 | 1/1991 | Takahashi et al. | 425/466 |

*Primary Examiner*—Jeffery Thurlow
*Attorney, Agent, or Firm*—Randy W. Tung

[57] ABSTRACT

An adjustable extrusion coating die having an inner block member, an outer block member, a mandrel mounted on said inner block member spaced from said outer block member at a predetermined distance, and means for maintaining said predetermined distance substantially constant.

6 Claims, 4 Drawing Sheets

ADJUSTABLE EXTRUSION COATING DIE

FIELD OF THE INVENTION

This invention generally relates to an adjustable extrusion coating die for extruding a profiled strip of polymeric material and, more particularly, relates to an adjustable extrusion coating die comprising an inner block member, an outer block member, a mandrel mounted on said inner block member spaced from said outer block member at a predetermined distance and means for maintaining the predetermined distance substantially constant.

BACKGROUND OF THE INVENTION

Profiled strips extruded of polymeric materials are widely used in automobile body applications as molding pieces. Molding pieces such as body side moldings or wheel well moldings are used to protect a vehicle body from impact damage and to protect edges of sheet metal panels from corrosion. Most of these molding pieces are extruded of thermoplastic materials such as PVC (polyvinyl chloride), thermoplastic rubber, thermoplastic urethane, or other flexible polymeric materials. PVC is one of the most widely used materials for its low cost and good physical properties.

Molding pieces such as body side moldings may be extruded of a plastic material alone or extruded in an extrusion coating process whereby plastic material is extruded onto a metal reinforcing substrate. In an extrusion coating process where plastic material is combined with a rigid metal substrate, a cross-head extrusion technique is used. In cross-head extrusion, a continuous length of metal reinforcing substrate is pulled through an extrusion die at 90° angle to the direction of the plastic flow while molten plastic material is being extruded onto the metal substrate. The metal reinforcing substrate is usually cleaned and dried through a multistation process and formed by a series of metal roll formers prior to the entry into the extrusion die.

In the extrusion of vinyl/metal substrate reinforced molding pieces, the metal reinforcing substrate slidingly engaging a mandrel in the cross-head die. The mandrel holds the continuous length of the metal reinforcing substrate in place when it passes through the cross-head die such that the thickness of the extrusion coated plastic material on the substrate may be held constant. In the practice of an extrusion coating process, this is difficult to achieve because of the constant wear of the mandrel surface. As the surface of the mandrel starts wearing down, the metal reinforcing substrate riding on the mandrel surface is being pushed away further from the die face. This would gradually lead to a thicker part since more plastic is being extruded onto the surface of the reinforcing substrate.

Traditionally, an extruder operator would have to stop the extrusion coating process and then raising the mandrel surface by using shim plates in order to maintain the constant distance between the die face and the mandrel surface. This is a very slow and time-consuming process since the extrusion process must be shut down and that the shimming process is performed by trial and error. Furthermore, since it is laborious to start an extrusion coating line and tuning the process into specification, any adjustment of the extrusion die that requires the shutting down of the process would not be desirable.

It is, therefore, an object of the present invention to provide an adjustable extrusion coating die that can be adjusted on the flight, i.e., during the extrusion run.

It is another object of the present invention to provide an adjustable extrusion coating die that can be easily adjusted mechanically during the extrusion run.

It is a further object of the present invention to provide a method of extrusion coating in which an adjustable extrusion coating die is utilized such that the thickness of the extruder plastic material can be adjusted during the extrusion run without shutting down the process.

SUMMARY OF THE INVENTION

The aforementioned objects can be achieved by the practice of my novel invention of an adjustable extrusion coating die.

In my adjustable extrusion coating die, an inner block member, an outer block member, a mandrel mounted on the inner block member spaced from the outer block member at a predetermined distance and means for maintaining the predetermined distance substantially constant are used.

In the preferred embodiment of my invention, the inner block member includes a base block having a cam surface and a sliding block having a follower surface. The outer block member having a die face and a die opening in the die face. The distance between the mandrel and the die face is kept substantially constant by moving the follower surface on the sliding block linearly with respect to the cam surface on the base block.

BRIEF DESCRIPTION OF THE DRAWINGS

Further objects, features and advantages of my invention will become apparent from a consideration of the following description, the appended claims and the accompanying drawings in which

DETAILED DESCRIPTION OF THE PREFERRED EMBODIMENT

In my preferred embodiment, a PVC profiled strip is made by extrusion coating a PVC resin composition onto a continuous length reinforcing metal substrate.

Figure 1:
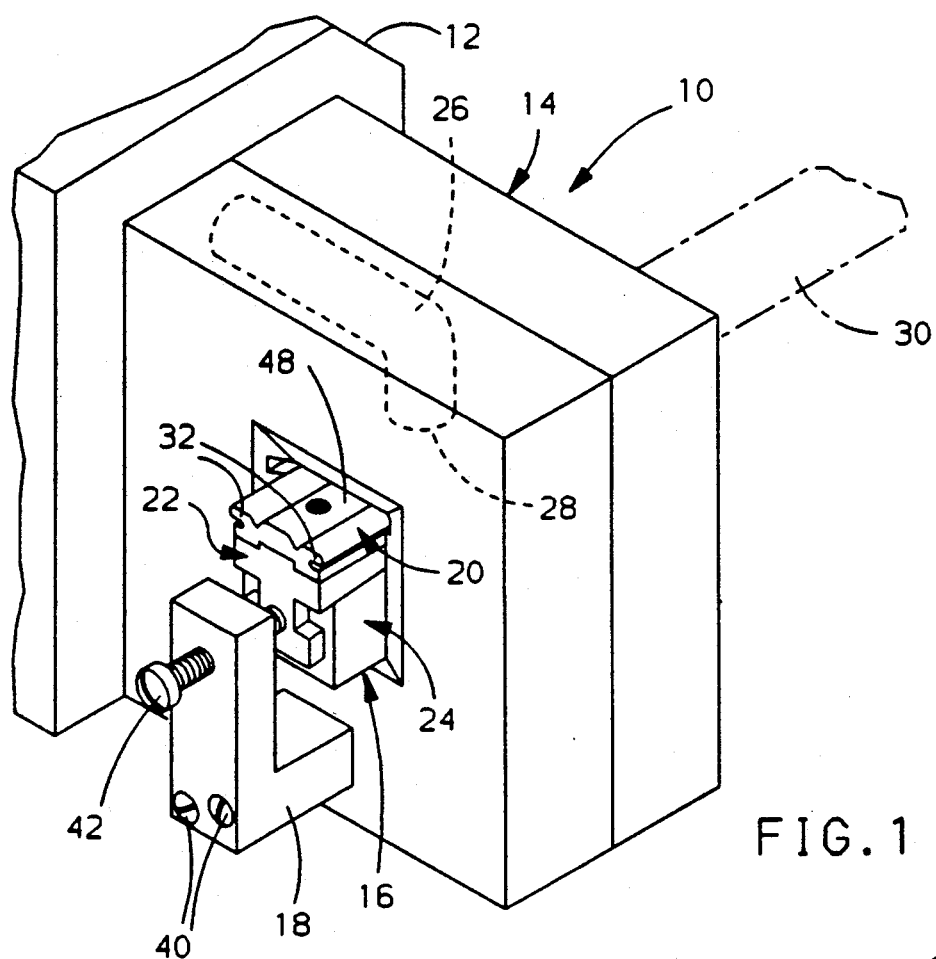
FIG. 1 is a perspective view of an extrusion coating die.

Referring initially to FIG. 1, wherein an extrusion coating die 10 is shown attached to the extruder head 12. The cross-head extrusion die 10 consists of an outer block 14, an inner block assembly 16, and an adjusting block 18. The inner block assembly 16, which is a die insert, consists of a mandrel 20, a sliding block 22, and a base block 24. The components of the inner block assembly 16 and the adjusting block 18 are also shown in FIG. 2.

The outer block, as shown in FIG. 1, is channeled with a flow channel 26 of the molten plastic to exit at the die opening 28 onto a continuous length of metal substrate 30. The continuous length substrate 30 slidingly engage mandrel 20 during the extrusion run and is held in place by the two ears 32 on mandrel 20. The mandrel 20 is fixed to the sliding block 22 by bolts 34. Normally, two bolts are used to attach mandrel 20 to sliding block 22. This is shown in FIG. 3.

The adjustable feature of the inner block assembly 16 is made possible by using a cam surface 36 on sliding block 22 and a follower surface 38 on the base block 234. The operation of the cam surface and the follower surface for making adjustment on the flight possible will be explained in FIGS. 5 and 6.

Figure 2:
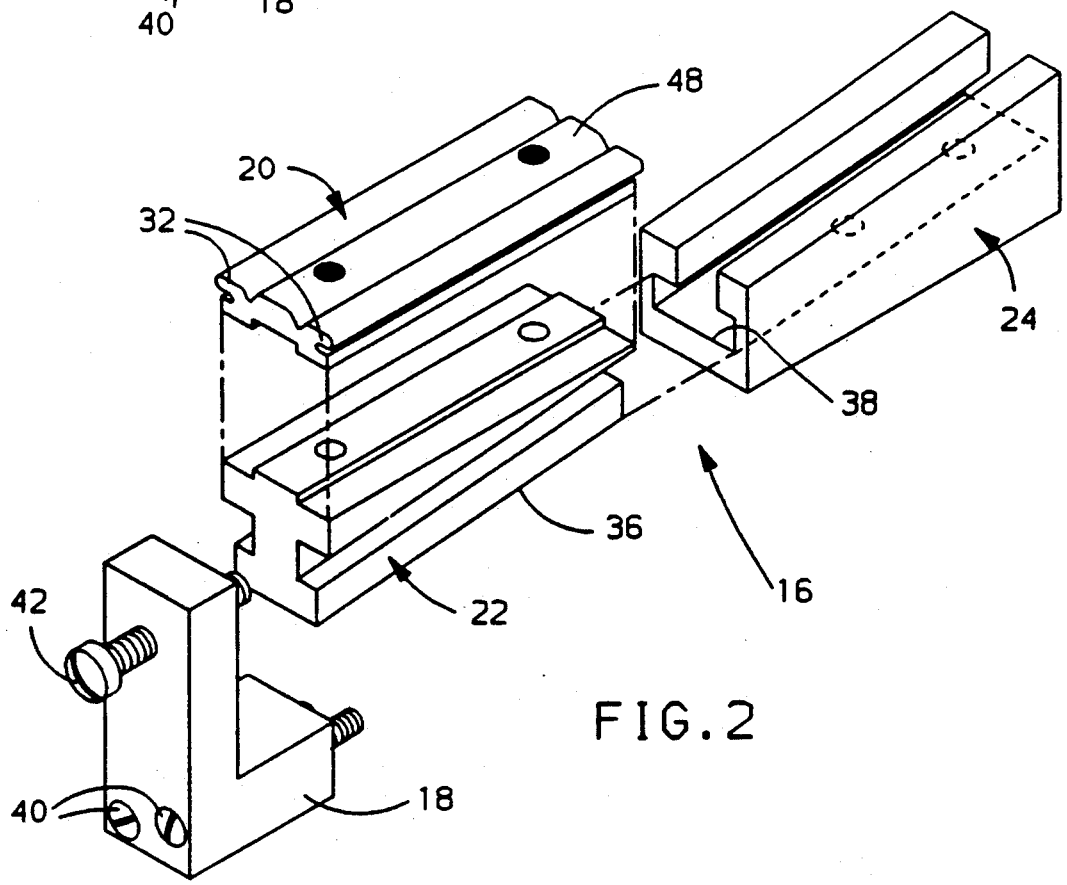
FIG. 2 is an exploded perspective view of the mandrel, the sliding block, the base block, and the adjusting block.
Figure 3:
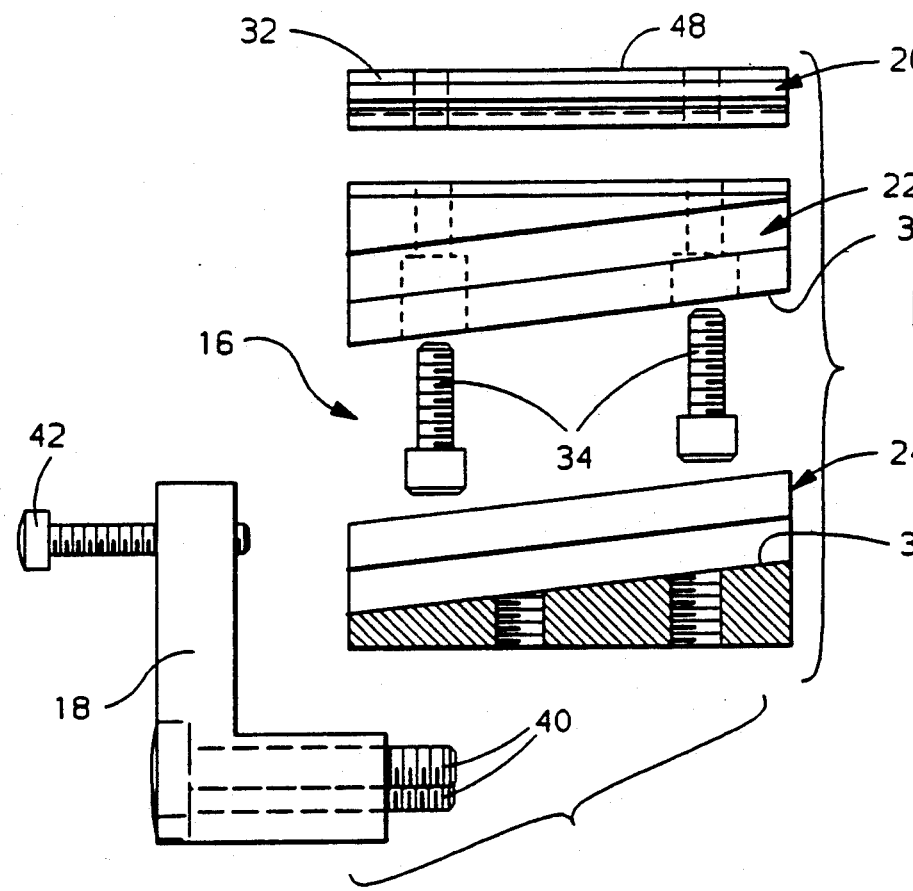
FIG. 3 is an exploded side view of the mandrel, the sliding block, the base block, and the adjusting block.
Figure 4:
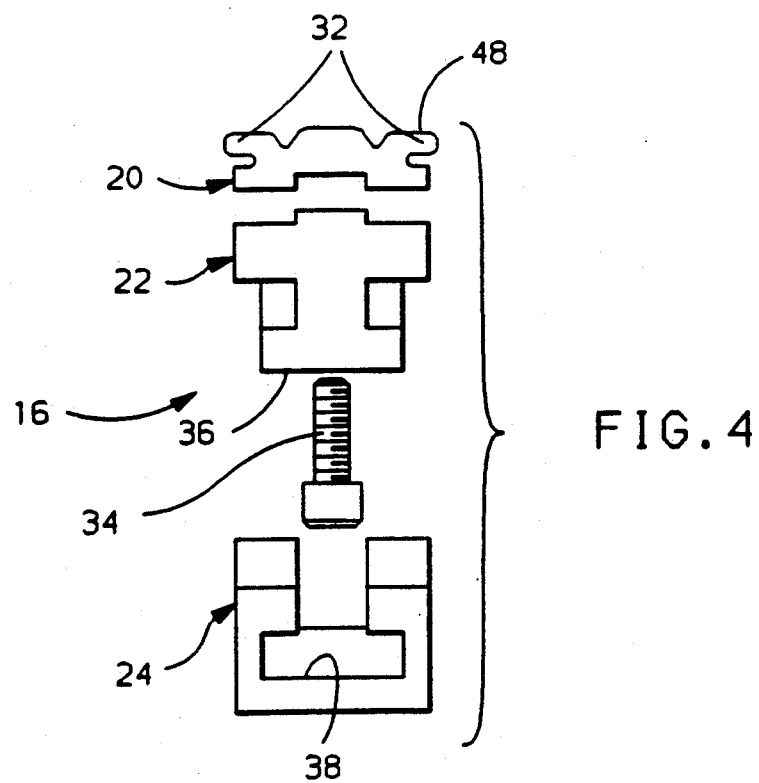
FIG. 4 is an exploded end view of the mandrel, the sliding block, and the base block.

Another important element of my adjustment on the flight inner die block assembly is the adjusting block 18, as shown in FIGS. 1, 2 and 3. The adjusting block 18 is an L-shape block fixed to the outer block member 14 by two bolts 40. An adjusting screw 42 is threaded through the adjusting block 18 to provide means for simple mechanical adjustment of the position of the sliding block 22 with respect to the base block 24. An exploded end view of the mandrel 20, the sliding block 22, the bolt 34, and the base block 24 is also shown in FIG. 4.

The mandrel 20 is normally made of an alloy material having superior lubricity and abrasion resistance. I have discovered that some aluminum alloys, specifically aluminum bronze, is suitable for this operation. The mandrel may be replaced after excessive wear by simply removing bolts 34. The other pieces of my extrusion die assembly are made with common tool steel.

The operation of my adjustable extrusion die can now be explained as follows. At the beginning of an extrusion run, a new mandrel 20 is used. This is shown in the cross-sectional view of the adjustable die assembly in FIG. 5. First, the base block 24 of my adjustable inner block assembly 16 is installed into the outer block member 14 by using two bolts 46 through the bottom of the block. At the beginning of the extrusion, a new mandrel 20 is installed which has an upper surface 48 and a thickness of x. The cam surface 36 on the sliding block 22 rests on the follower surface 38 on the base block 24 in a starting position where the adjustment screw 42 is in a full-out position. At this starting position, a predetermined thickness of plastic coating 50 on substrate 30 is obtained as determined by the distance between the upper mandrel surface 48 and the die face 52 in the outer block member 14. This is shown in FIG. 5.

As the extrusion process progresses, the constant friction of the substrate 30 on the upper mandrel surface 48 produces wear on the upper mandrel surface 48. A worn mandrel, exaggerated for illustration purpose, is shown in FIG. 6. It is seen that the thickness of the mandrel member 20 is worn down from x at the beginning of the extrusion run shown in FIG. 5 to y shown in FIG. 6. In order to maintain the thickness of the plastic coating 50 on substrate 30 constant (as shown in FIGS. 7 and 8), the adjusting screw 42 on the adjusting block 18 is forwarded to push the sliding block 16 such that the cam surface 36 on sliding block 22 rides up the follower surface 38 on base block 24 by a distance of z as shown in FIG. 6 This adjustment maintains the distance between the upper surface 48 of the mandrel 20 and the die face 52 of the outer block member 14 constant and thereby maintaining the thickness of the plastic coating 5 on substrate 30 constant.

Figure 5:
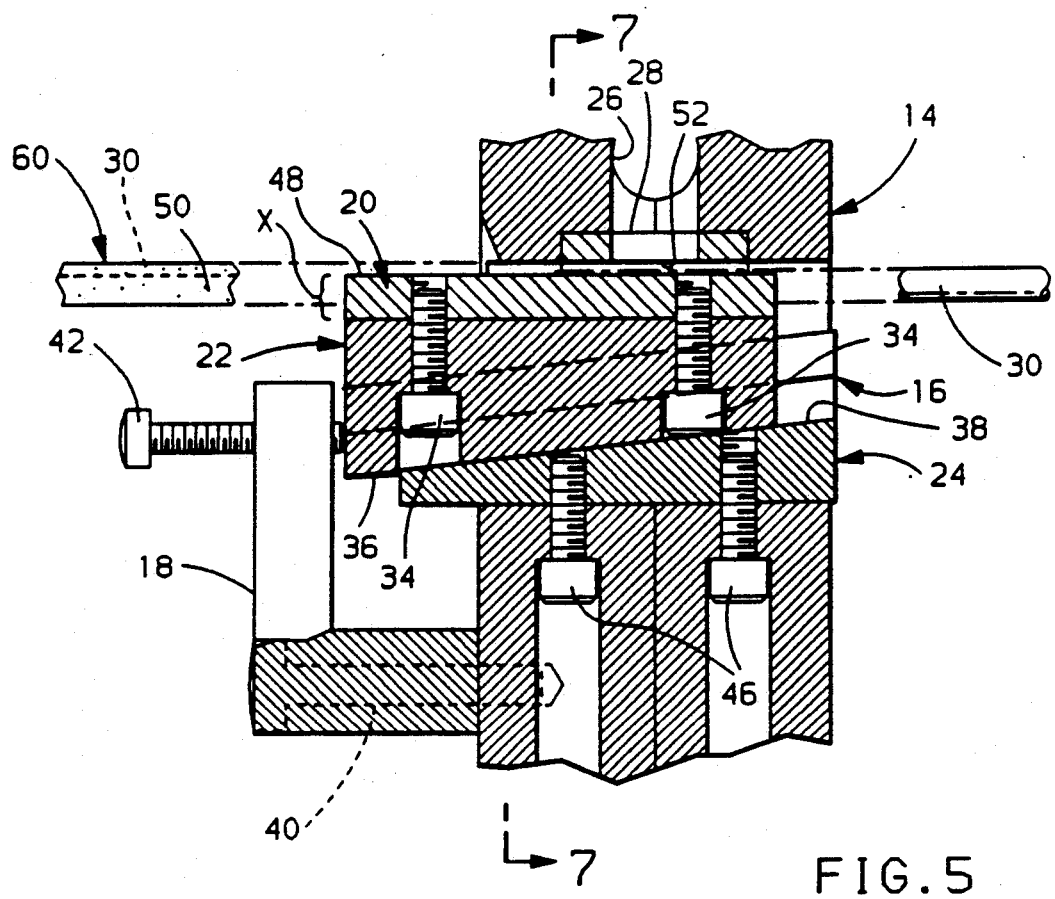
FIG. 5 is a cross-sectional view of the adjustable extrusion coating die at the starting position.
Figure 6:
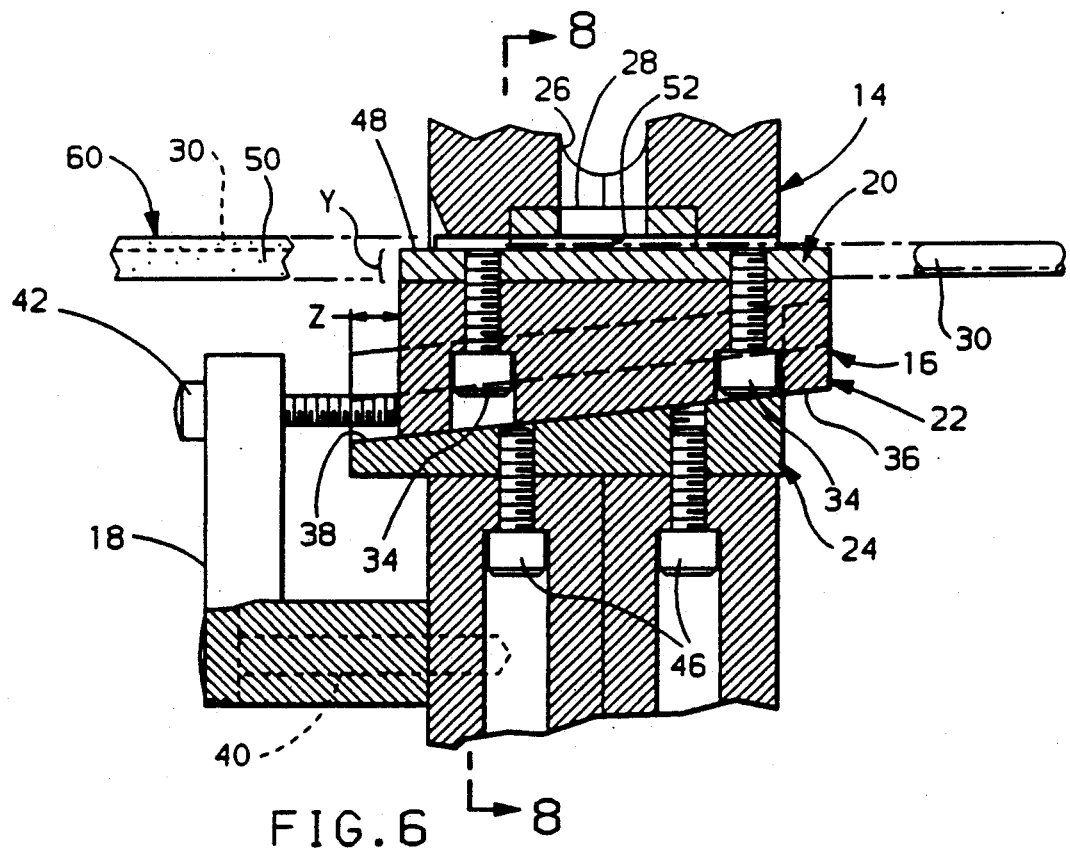
FIG. 6 is a cross-sectional view of the adjustable extrusion coating die at the end position.
Figure 7:
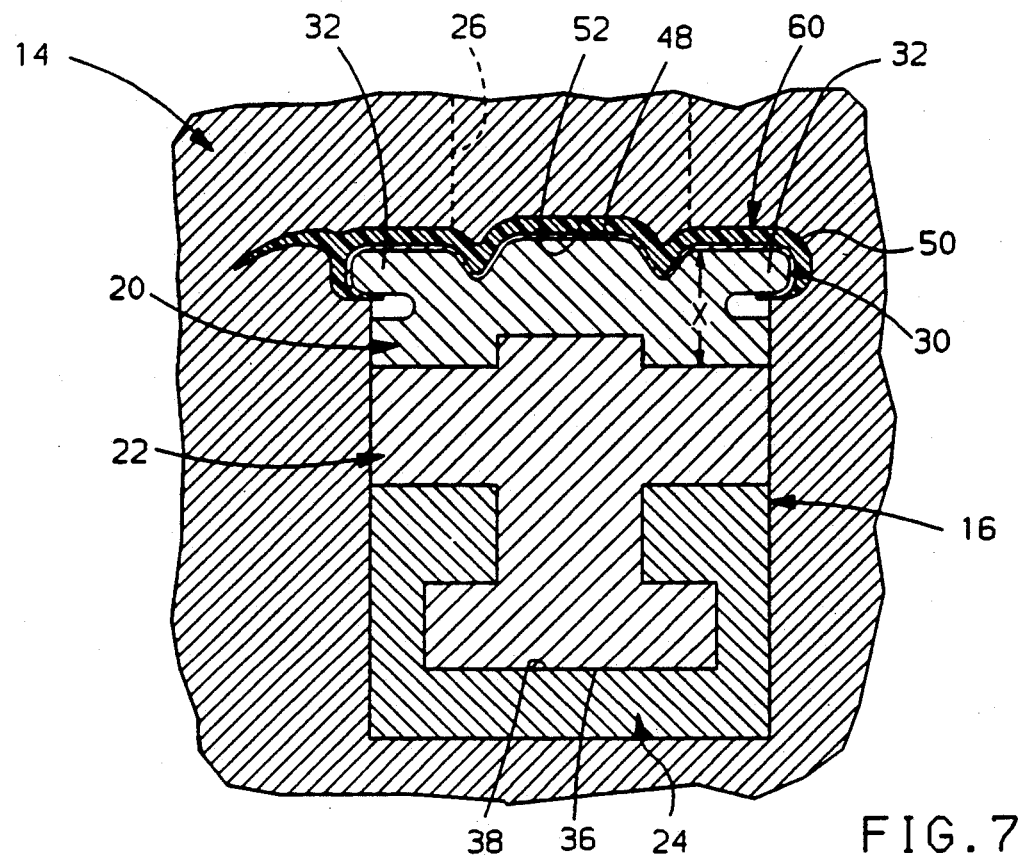
FIG. 7 is an enlarged cross-sectional view taken along line 7—7 of FIG. 5.
Figure 8:
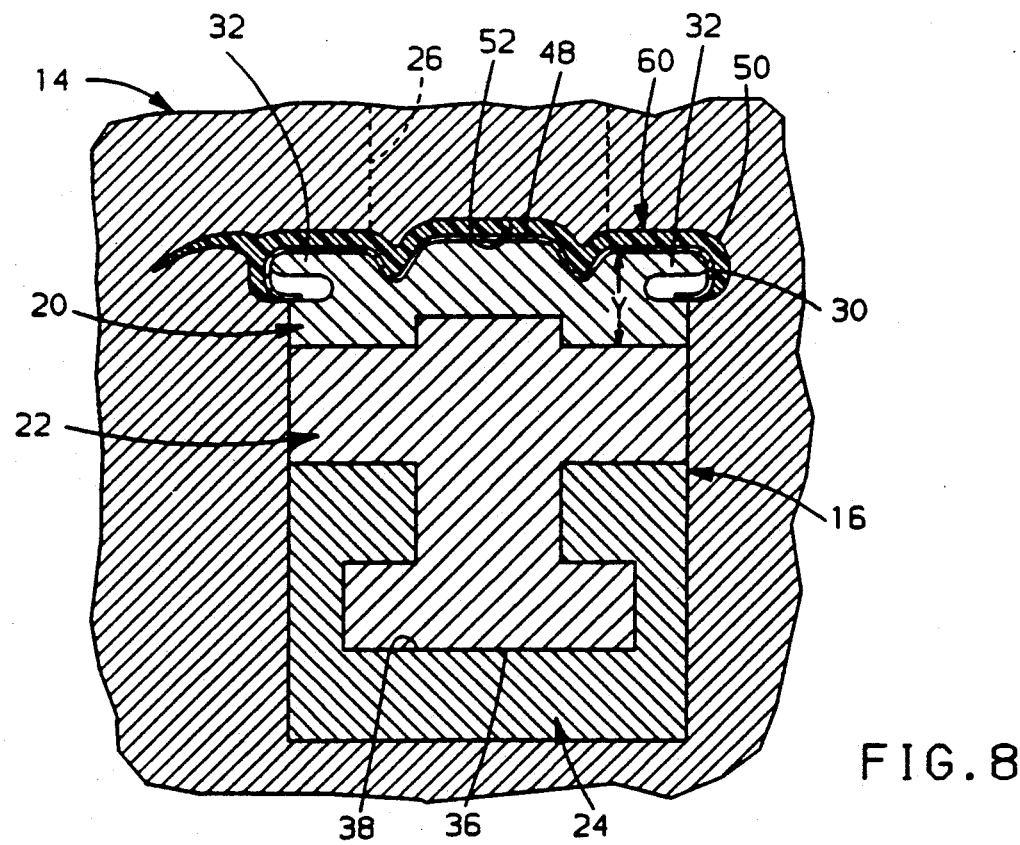
FIG. 8 is an enlarged cross-sectional view taken along line 8—8 of FIG. 6.

An enlarged cross-sectional view taken along line 7—7 of FIG. 5 is shown in FIG. 7, and similarly, an enlarged cross-sectional view taken along line 8—8 of FIG. 6 is shown in FIG. 8. It is seen in FIGS. 7 and 8, even though the thickness of the mandrel was worn down from x to y after a lengthy extrusion process, my novel adjustment technique enables one to produce a profiled extrusion piece 60 at consistent thickness. I have discovered by using a 16 pitch ¼ inch screw as the adjusting screw 42, each complete turn of the screw will increase the height of the mandrel upper surface by 0.005 inch. I have also discovered that by using my novel technique, on the flight adjustment of the extrusion thickness is possible without shutting down of the extruder. A mandrel made of a suitable material, such as that of aluminum bronze, may be used of several weeks in continuous extrusion without replacement. Replacement is only necessary when the thickness of the mandrel is worn down to such an extent that any adjustment would no longer be possible.

It should be noted that even though I have only disclosed a mechanical adjustment method by using the adjusting block in my preferred embodiment, any other adjustment methods that are well known in the art such as adjustment hydraulically or electrically may also be suitably used. It is also to be appreciated that those skilled in the art will readily apply the teachings given here to other possible variations of my invention.

I claim:

1. An adjustable extrusion coating die comprising
an inner block member;
an outer block member having a flow channel and coacting with said inner block member forming a die opening;
a mandrel mounted on said inner block member for feeding substrate, said mandrel being spaced from said outer block member at a predetermined distance; and
means for maintaining said predetermined distance substantially constant.

2. An adjustable extrusion coating die comprising
a inner block member includes a base block and a sliding block;
an outer block member having a flow channel, a die face coacting with said inner block member forming a die opening;
a mandrel mounted on said base block for feeding substrate, said mandrel being spaced from die face at a predetermined distance; and
means for maintaining said predetermined distance substantially constant.

3. The die as defined in claim 2 wherein said means for maintaining said predetermined distance substantially constant further comprising
a cam surface on said base block and a follower surface on said sliding block.

4. The die as defined in claim 3 wherein said means for maintaining said predetermined distance substantially constant further includes moving the follower surface linearly with respect to said cam surface.

5. A method of extrusion coating a second material onto a first material by using an adjustable on the flight extrusion coating die including an inner block member, an outer block member, a mandrel mounted on said inner block member spaced from said outer block member at a predetermined distance and mechanical means for maintaining said predetermined distance substantially constant, said method comprising the step so f slidingly engaging a first material to said mandrel member and extruding a second material from said outer block member onto said first material, said second material having a substantially constant thickness conforming to the predetermined distance between said mandrel and said outer block member adjustable by said mechanical means.

6. A method of extrusion coating a second material onto a first material by using an adjustable on the flight extrusion coating die including an inner block member having a base block and a sliding block, an outer block member, a mandrel mounted on said sliding block member spaced from said outer block member at a predetermined distance and a cam surface on said base block and a follower surface on said sliding block for maintaining said predetermined distance substantially constant, said method comprising the steps of slidingly engaging a first material to said mandrel member and extruding a second material from said outer block member onto said first material, maintaining said second material at a substantially constant thickness by linearly moving said follower surface with respect to said cam surface.

* * * * *